Patented Oct. 7, 1952

2,613,222

UNITED STATES PATENT OFFICE 2,613,222

PREPARATION OF ACRYLIC ACID AND ITS ANHYDRIDE

Edward H. Specht, Philadelphia, Andrew Neuman, North Hills, and Harry T. Neher, Bristol, Pa., assignors to Rohm & Haas Company, Philadelphia, Pa., a corporation of Delaware No Drawing. Application April 6, 1951, Serial No. 219,752

11 Claims. (Cl. 260—533)

This invention deals with a method for preparing acrylic acid and/or its anhydride. More specifically this invention concerns a process in which there are brought together water, acid, nickel carbonyl, acetylene, and carbon monoxide at relatively low temperature with the formation of acrylic acid and, if desired, acrylic anhydride.

It was observed by Dr. Reppe and his collaborators that an alcohol, nickel carbonyl, an acid, and acetylene reacted to give an acrylic ester of the alcohol. If water was present in this reaction, there was also formed acrylic acid. It was further found by these research workers that at temperatures of 130° to 180° C. under pressures of 20 to 30 atmospheres that acrylic esters resulted from the reaction of acetylene, carbon monoxide, and alcohol in the presence of a nickel halide as catalyst. Nickel carbonyl could not be used as catalyst under the conditions required for this catalytic reaction. It was found that if a mixture of acetylene and carbon monoxide was passed into an alcohol containing nickel carbonyl and acid at temperatures low enough to permit making this combination, no reaction resulted. From observations made during the work described above it was asserted that acrylic acid could be made by the same methods which were used for the preparation of acrylic esters by substituting water for alcohol.

We have confirmed that if water, an acid such as hydrochloric acid, nickel carbonyl, and acetylene are brought together in approximately stoichiometric amounts there are in fact formed acrylic acid and nickel chloride, thus theoretically

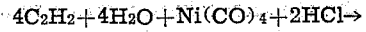

$$4C_2H_2 + 4H_2O + Ni(CO)_4 + 2HCl \rightarrow 4CH_2=CHCOOH + 2(H) + NiCl_2$$

The hydrogen is apparently used up in reduction reactions, as it does not appear as a gas in the reaction products. Propionic acid is one of the possible reduction products. If a mixture of equal volumes of acetylene and carbon monoxide is run into an acidified aqueous solution containing nickel carbonyl at 30° to 75° C., no reaction is observed. If such a mixture were to be reacted, it would appear necessary to revert to the high temperatures and pressures found necessary for the reaction of alcohol, carbon monoxide, and acetylene and to utilize nickel bromide or iodide as a catalyst. At the temperatures necessary for effecting such a reaction, however, water is not a suitable reactant, just as alcohols lower than butyl were found unsuitable. Pressure apparatus would then be needed and there would be present all of the problems, complications, and hazards which arise in handling acetylene at high pressures and temperatures. Organic halogen-containing compounds would be formed and nickel lost from the reaction system. Decomposition and polymerization problems would also be present.

We have now found that the reaction of water, acetylene, and carbon monoxide can be made to occur catalytically at low to moderate temperatures and at low pressures when effected concurrently in the presence of the reaction of water, acetylene, nickel carbonyl, and a suitable acid. In the actual carrying out of the catalytic reaction between water, acetylene, and carbon monoxide it is necessary first to effect the reaction of water, acetylene, nickel carbonyl, and acid, a reaction here for convenience termed the stoichiometric reaction, and to maintain this reaction while there is imposed upon it the catalytic reaction.

Usually the reaction for preparing acrylic acid or anhydride is started by passing acetylene gas into a mixture containing water, nickel carbonyl, and a reactive acid, such as hydrochloric. Reaction is soon evident as shown by absorption of acetylene, rise in temperature, and the development of color. At an early stage of reaction a yellowish or brownish color ordinarily appears, which in most cases disappears or is concealed by a deep green color. When this reaction is established, the catalytic reaction is superimposed thereon. This may be done in a number of ways. When there is present a reacting mixture containing an excess of water, nickel carbonyl, and acid, carbon monoxide may be added along with the acetylene. The reactions proceed until the amount of nickel carbonyl is so reduced that it supplies less than one-third of the total CO being reacted. Alternatively, after the reaction of water, acetylene, nickel carbonyl, and acid has been established and while the reaction of these is continued, there are run in acetylene, carbon monoxide, and water in approximately reacting proportions. The reactions continue as long as these various reactants are properly supplied or until the nickel carbonyl is reduced to a low concentration.

The process is rendered continuous by passing nickel carbonyl, water, carbon monoxide, and acetylene, all in proper proportion as will be explained below, into a reaction medium wherein acrylic acid is being formed by the stoichiometric reaction so that there are always present in this medium the ingredients for the stoichiometric reaction. After the reaction has once been started, the acrylic acid which is formed may desirably supply all of the acid that is needed for reaction with the nickel carbonyl used in the stoichoimetric reaction.

An expedient for getting the reactions rapidly under way is to prepare a reaction medium which approaches in composition that which is present when the system is reacting under equilibrium conditions. For this purpose there are mixed in the reaction vessel water and acrylic acid, preferably with an inert, at least partially water-miscible organic solvent, with or without nickel carbonyl. Acetylene and nickel carbonyl are passed into the mixture until the stoichiometric reaction is proceeding smoothly. There are then admitted carbon monoxide, water, and additional amounts of acetylene in approximately reacting proportions. It is best to begin the addition of these reactants at a moderate rate and increase the rate of addition gradually to ensure stability of the reaction system and continuous reaction. Reaction mixture may be withdrawn in continuous operation at a rate equivalent to that at which the added reactants, water, nickel, carbonyl, acetylene, and carbon monoxide, are introduced. If, through failure to maintain proper conditions in the reaction system, or through some interruption in the reaction, the reactions should cease, the supply of carbon monoxide is shut off, the stoichiometric reaction of water, acetylene, nickel carbonyl, and acid is reestablished, and the catalytic reaction is then again imposed thereon with the various reactants being run into the reaction vessel in balanced proportions.

By adjustment of the rates of addition and withdrawal, control of the holding time in the apparatus, and adjustment of proportions of reactants the principal product can be acrylic acid or it can be acrylic anhydride. Proportions may be about in accordance with the following equations to give acrylic acid (a) $Ni(CO)_4 + 4C_2H_2 + 4H_2O + 2HX \rightarrow 4CH_2=CHCOOH + 2(H) + NiX_2$ and (b) $C_2H_2 + CH + H_2O \rightarrow CH_2=CHCOOH$ X being an anion of a reactive acid. There is sometimes found a small amount of acrylic anhydride in the reaction mixture as the reactions approach completion. This is probably due to the reactions (a') $Ni(CO)_4 + 4C_2H_2 + 6CH_2=CHCOOH \rightarrow 4(CH_2=CHCO)_2O + Ni(OCOCH=CH_2)_2 + 2(H)$ and (b') $C_2H_2 + CO + CH_2=CHCOOH \rightarrow (CH_2=CHCO)_2O$ If desired, the reaction may be run stepwise, acrylic acid being produced in the first step and this acid then converted to anhydride in a second step. This has some relative advantages in separating and recovering nickel.

It is not necessary, however, to go through two separate steps. The process may be operated according to the equations (a'')
$$Ni(CO)_4 + 4C_2H_2 + 3H_2O \xrightarrow{(H^+)} (CH_2=CHCO)_2O + Ni(OCOCH=CH_2)_2 + 2(H)$$

and (b'') $2CO + 2C_2H_2 + H_2O \rightarrow (CH_2=CHCO)_2O$

It is, of course, desirable to try to maintain the "b" reactions in as high a proportion to the "a" reactions as is practical. As will be explained, there are limits to the relative proportions of the "b" reactions which can be used.

There is an upper limit for the proportion of carbon monoxide to nickel carbonyl which can be admitted to the reaction system, particularly under equilibrium conditions of continuous operation. This upper limit depends somewhat on the proportions of other reactants, upon temperature, and upon the particular conditions resulting from the design and operation of the reaction system. This limit is most conveniently defined in terms of mole percentage of CO supplied by the carbon monoxide to the total CO supplied by both carbon monoxide and nickel carbonyl. As a result of careful investigation, it has been determined that the upper limit for carbon monoxide utilization is 65 mole per cent of the total CO involved in both "a" and "b" equations. Optimum limits at which the processes can be operated continuously and efficiently without danger of interruptions from possible cessation of either reaction are 50 to 60 mole per cent of carbon monoxide based on the total CO available. The lower limit is dictated by economic considerations, it being advisable to use at least 20 mole per cent of carbon monoxide with reference to CO from carbon monoxide and nickel carbonyl.

Addition of acetylene is adjusted to give an amount approximately proportional to the total CO (on a molar basis). A small excess of acetylene is preferred. The operative proportion of acetylene to total CO (from both carbon monoxide and nickel carbonyl) should be within a tenth mole of theory, i. e., from about 0.9 mole to 1.1 moles of acetylene per mole of total CO. A ratio from 1.02:1 to 1.05:1 is preferred.

While water may be used in the theoretical proportion, it has been found better to use water in excess of the theoretical requirements for producing either acrylic anhydride or acrylic acid. This condition renders the reaction system more stable. Water may serve in part as a solvent in the reaction system. A very large excess of water, however, slows up the reaction as neither the gases nor nickel carbonyl have favorable solubilities in water. When water is used in an excess of 5% to 50% on a molar basis, the reactions run well and usually without interruption from loss of the stoichiometric reaction. Of course, with water used in about the proportions required in Equations a and b above or in excess thereover, the product tends to be primarily acrylic acid. As the proportion of water is reduced, the reaction mixture first becomes more concentrated with respect to acrylic acid and then the reaction mixture begins to contain some acrylic anhydride. As the proportion of water is further decreased, the product becomes chiefly anhydride. In this case it can be considered that acrylic acid becomes a reactant with acetylene and carbon monoxide and/or nickel carbonyl. The anhydride is, of course, convertible to acid by reaction with water. Yet in concentrated solutions acrylic anhydride can be present in acrylic acid which also contains water.

If water, acetylene, carbon monoxide, and nickel carbonyl are to be reacted to give acrylic anhydride or acrylic acid, the minimum proportion of water which is operative is about one half mole of water per mole of total CO, acrylic anhydride then being the ultimate product. When acrylic acid is the desired product, it is best to operate the process with a proportion of water between 1.05 and about 1.5 moles of water per unit of carbonyl, CO, from both carbon monoxide and nickel carbonyl. Thus, the proportion of water used may preferably be varied from 0.5 to 1.5 moles per CO unit, yet it may be effectively as high as ten moles.

For the optimum or the maximum utilization of carbon monoxide the reactions are performed in the presence of a solvent. While the stoichiometric and catalytic reactions have been carried out in the presence of solvents immiscible with water, such as benzene, toluene, and ethylene dichloride, the utilization of carbon monoxide was then found relatively poor. Best results are had when the solvent is at least partially water-miscible and water has some degree of solubility in the solvent. Mixtures of such solvents are also effective. Preferred solvents include acetone, methyl ethyl ketone, and dioxane. Other inert, water compatible solvents, that is, those having at least some solubility in water and possessing capacity for dissolving at least 3% of water in them, include methyl $\beta$-methoxypropionate, the dimethyl and diethyl ethers of ethylene glycol and polyglycols, and the acetates of the methyl or ethyl ethers of these glycols.

Solvent is preferably used in a proportion from one to five parts per part of water by weight. More solvent can be used, but without advantage. Less solvent can also be used, but then the utilization of carbon monoxide becomes less favorable. It is best to operate the process with a proportion of solvent between about two and five parts of solvent per part of water. The solvent and water can be run into the reaction vessel in desired proportion. Solvent is, of course, taken off along with the products. The solvent and acrylic acid or anhydride are separable through distillation.

In the reactions as described above, acrylic acid is shown as a particularly desirable acid to react with nickel carbonyl and thus make available the carbonyl groups for reaction with acetylene and water. Acrylic acid may, however, be replaced for this purpose with other acids which will release carbonyl groups from the nickel carbonyl. For example, hydrochloric acid may be added to the reaction mixture in an amount about equivalent to the nickel carbonyl. There is then formed nickel chloride, which can be separated from the reaction products and used as a source of nickel in the preparation of nickel carbonyl which is returned to the reaction system. Hydrobromic acid is equivalent in its action to hydrochloric acid. In place of acrylic acid or hydrochloric acid in organic acid such as a water-soluble lower fatty acid including chloroacetic acid, acetic acid or propionic acid can be used. The last may be undesirable as it is not practical to separate propionic acid and acrylic acid. Nevertheless at the start of the reaction there may be used an acid other than acrylic. As soon as acrylic acid is formed, the use of another acid is no longer required. There is then no problem of separating acids or contaminating the acrylic acid or anhydride with another acid.

Thus, if no acrylic acid is at hand, acetic acid or hydrochloric acid may be used as preferred acids for reacting with nickel carbonyl to initiate reaction. After the reactions are proceeding, addition of such acid may be discontinued. If acrylic acid is at hand, it may be added at the start to supply the acid needed to effect the stoichiometric reaction, which will continue with acid made in the reaction system. This is the preferred procedure, but the process is not thus limited.

Hydrochloric acid may be added in the form of anhydrous hydrogen chloride during the course of the reaction to form acrylic acid. Hydrogen chloride combines with the nickel carbonyl to form nickel chloride which separates as a more or less finely divided solid. If excess water is present, the nickel can be removed as a hydrated nickel chloride. In any case separation can be effected by the simple step of filtration. When acrylic anhydride is to be prepared, it is best not to use hydrogen chloride beyond the initial stage. In fact the reactions of acrylic acid, acetylene, carbon monoxide, or nickel carbonyl are best effected without addition of an extraneous acid.

When acrylic acid reacts with nickel carbonyl, there is formed nickel acrylate. Acrylic acid is readily recoverable therefrom by addition of sulfuric acid to form nickel sulfate. When sufficient water is present, the nickel sulfate separates as practically pure nickel sulfate hexahydrate. The form of this salt is particularly favorable for filtering off the nickel compound and yielding acrylic acid, leaving behind in solution no more than a slight trace of nickel. It is a preferred practice in working up reaction mixtures containing acrylic acid to add sulfuric acid together with water in such an amount that the added water and the water already present in the reaction mixture supply six moles of water per mole of nickel sulfate. Under these conditions anhydrous acrylic acid is readily obtained.

After separation of nickel sulfate crystals, the reaction mixture can be distilled. If traces of water remain therein, they are taken off azeotropically with the solvent. Acrylic acid is purified by distillation best under reduced pressure. The temperature is then kept relatively low and polymerization is avoided. A polymerization inhibitor such as hydroquinone, catechol, pyrogallol, $\beta$-naphthol, copper, or the like may be present during purification. Such an inhibitor may also be used in the reaction mixture, but is not usually necessary.

When acrylic anhydride is formed, it is most conveniently separated by distillation. Two distillations are desirable, the first to separate volatile materials from nickel acrylate and the second to separate out acrylic anhydride. The nickel acrylate can be treated with a strong inorganic acid to yield a nickel salt, such as nickel chloride or sulfate, and acrylic acid recovered by distillation. This may be used as such or returned to the reaction system.

Acetylene and carbon monoxide used in the process of this invention should be low in oxygen and preferably essentially free of oxygen. For stable, continuous operation these gases should contain less than one half of one per cent oxygen. Acetylene should have no appreciable content of sulfide or lower valence compounds of phosphorus or arsenic. Acetylene can be purified by conventional methods, such as oxidation of impurities with ferric or cupric chloride. Inert gases such as carbon dioxide, nitrogen, or hydrogen act merely as diluents. There may thus be used commercial sources of acetylene or carbon monoxide with no more than simple precautions.

The temperature of the reaction mixture may be between 25° and 75° C. with the range of 35° to 55° C. being definitely preferred. The reaction takes place without added pressure and it often happens that the rapid rate of reaction causes the pressure within the reaction vessel to be below atmospheric. Increased pressures may be used with suitable allowance for removing heat of reaction.

At the start of the reaction it is desirable to sweep out air from the reaction vessel with the aid of an inert gas such as nitrogen. This gas is displaced with acetylene and the reaction mixture is thereafter maintained under an inert atmosphere composed of the acetylene and carbon monoxide used in the reactions.

The reaction vessel is charged with water, solvent, if used, an effective acid, and nickel carbonyl. Acetylene is passed into the charge. The stoichiometric reaction may start spontaneously or may be initiated by warming the charge. When the stoichiometric reaction begins, there is noted a rise in temperature and development of color. Water, nickel carbonyl, and acetylene may then be passed into the reacting mixture in approximately stoichiometric proportions along with an inert, at least partially water-miscible solvent. When the stoichiometric reaction is established, carbon monoxide is also run in and the flow of water, solvent (when used), nickel carbonyl, acetylene, and carbon monoxide adjusted to maintain both the stoichiometric reaction and the catalytic reaction.

If the reaction is run batchwise, the flow of reactants is discontinued at the proper time. There will be present in the reaction mixture some nickel carbonyl. This is used up by running acetylene into the reaction mixture. If the reaction is run in a continuous fashion, reaction mixture is taken from the reactor by overflow, by a split-stream method, or the like. Acetylene is passed into the withdrawn mixture and reacted with the nickel carbonyl therein in the presence of water and/or acrylic acid. The reaction mixture is then worked up with separation of nickel salt and isolation of product. Solvent is recovered and sent back to the reactor. Nickel is reconverted to nickel carbonyl and reused. In effect, therefore, acetylene, carbon monoxide, and water are reacted to form acrylic acid and/or acrylic anhydride usually with consumption of a cheap inorganic acid.

Further details of operation, possible variations in conditions, and effective methods of carrying out the process of this invention are shown in the following illustrative examples. Parts are by weight unless otherwise designated.

*Example 1*

An apparatus was arranged with stirrer, thermometer, cooling coil, addition tube for charging, inlet tubes at the bottom, vent tube at the top, and an overflow pipe near the top. Liquids could be supplied from reservoirs therefor to an inlet tube through metering pumps and gases were blown into the apparatus through an inlet tube, being measured with manometric flowmeters. Acetylene before use was passed through activated charcoal to remove acetone. Vent gases were passed through cold condensers to a wet-test meter.

The apparatus was swept with nitrogen and charged with 500 parts by weight of acrylic acid, 18 parts of water and 900 parts of dioxane. A reservoir was initially charged with a solution of 85 parts of nickel carbonyl in 239 parts of dioxane, additional amounts of such solution being later supplied as needed. This liquid was pumped into the reactor at the rate of 2.7 parts per minute. Acetylene was also fed to the reactor. Water was then metered in at the rate of 0.9 part per minute. After about ten minutes reaction began as shown by an increase in temperature and a decrease in the rate at which gas was vented. At this time a portion of 9 parts of nickel carbonyl was added, the regular supply thereof and of the other reactants being continued at the above rates. At 20 minutes the temperature of the reacting mixture had risen to 40° C. A slow flow of carbon monoxide was then begun, the rate of addition being increased at ten minute intervals until 60% of the CO being reacted came from the carbon monoixde. Adjustments were also made in the rate of flow of other materials so that when 60% utilization of carbon monoxide was reached the rates per hour of addition were carbon monoxide 1.50 moles, nickel carbonyl 0.25 mole, acetylene 2.55 moles, water 2.75 moles, and solvent about 1.36 moles. The temperature rose to 45° C. and was maintained at about this level by a slow stream of water passing through the cooling coil. After 1.75 hours of operation the reaction vessel was filled with the reaction mixture, which then began to overflow through the trapped pipe provided therefor into a reservoir. Under these conditions of operation vent gas was taken off at a rate of about 4% of the total gas fed to the reactor. After 6 hours and 32 minutes of operation the supply of nickel carbonyl in dioxane was shut off. Ten minutes later the supply of water was discontinued. Four minutes thereafter a sudden increase in the volume of vent gas indicated that the reaction had ceased. The carbon monoxide was shut off and acetylene was fed at a rate of about one mole per hour to react with nickel carbonyl remaining in the reactor. The mixture in the reactor was drawn off and the reaction mixture from the overflow reservoir was returned to the reactor where it was treated with acetylene to consume the small amount of nickel carbonyl which it contained, 13 minutes being required to achieve this end.

A portion of 986 parts of the reaction mixture was treated with a sulfuric acid solution prepared from 83.5 parts of 96% sulfuric acid and 15 parts of water. The resulting mixture was cooled and stirred. Nickel sulfate formed as a blue-green hydrate. It was filtered off to give 784 parts of a pale yellow-green filtrate. This was treated with a little β-naphthol and was distilled through a packed column under reduced pressure. After a forerun, which contained some acrylic acid, had been distilled, a main fraction of about 270 parts was taken at 50.7° C./19 mm. This contained a small amount of acrylic anhydride and contained by analysis 97% of acrylic acid. The yield of acrylic acid was 75% based on the total CO supplied.

*Example 2*

The apparatus described in Example 1 was utilized and the general method there used was followed with some modifications. Methyl ethyl ketone was substituted for the dioxane and a greater volume of solvent was used. The initial charge consisted of 208 parts of acrylic acid which had been treated with one part of β-naphthol, 25 parts of water, and 225 parts of methyl ethyl ketone. The nickel carbonyl feeder was initially charged with a solution of 85 parts of nickel carbonyl in 330 parts of methyl ethyl ketone, this feeder being recharged as necessary with additional amounts of the same composition. This solution was fed to the reactor at the rate of 0.25 mole of nickel carbonyl per hour. Acetylene was started at the rate of one mole per hour. Within four minutes the stoichiometric reaction had started. There was then added a portion of 11 parts of nickel carbonyl and the carbon monoxide supply was started. Reaction ceased, however, in about three minutes. The supply of carbon monoxide was shut off and 160 parts of methyl ethyl ketone were run into the reactor. In about ten minutes the stoichiometric reaction was again established. The supply of carbon monoxide was turned on at a slow rate, this being increased as also the rate of supply of acetylene as the reaction progressed. At 45 minutes the feed rates were 0.82 mole per hour of carbon monoxide and 1.86 moles per hour of acetylene. At 60 minutes rates per hour were 1.22 moles of carbon monoxide and 2.27 moles of acetylene. At 90 minutes rates per hour were 1.50 moles of carbon monoxide and 2.55 moles of acetylene. Overflow began at 200 minutes. Vent rate was 3.6% of the total gases fed. At 365 minutes the supply of nickel carbonyl was discontinued and eight minutes later supply of carbon monoixde was discontinued. Acetylene at a reduced rate was continued for four minutes. The reaction was then withdrawn and replaced with the mixture from the overflow reservoir. This was treated with acetylene for seven minutes. The total reaction mixture amounted to 2780 parts. Five parts of nickel carbonyl was recovered from the cold condensing system. The total parts fed were as follows: nickel carbonyl 269, carbon monoxide 233, acetylene 390, and water 400. A total of 14.5 moles of CO was used up with 15.0 moles of acetylene being consumed. A portion of 1341 parts of the reaction mixture was set aside as the starting solution for another preparation. To the remaining 1439 parts there was added an 84 parts portion of 96% sulfuric acid. The resulting mixture was stirred and cooled. A finely divided blue-green crystalline solid formed. It was separated by filtration to give 1165 parts of a clear light yellow-green filtrate. This was distilled under reduced pressure. After a forerun had been taken off, the main fraction was collected at 51° C./20 mm. It consisted of 97.5% of acrylic acid and 2.1% of acrylic anhydride. There was a small residue. The distillates gave a yield of 68.6% of acrylic acid and a yield of 1.6% of acid in the form of anhydride. From washing the filter cake and reactor there was recovered enough acid to increase the yield by 11.3%. The total acrylic acid obtained then corresponds to a yield of 81.5%.

Analysis of the nickel salt obtained showed that it was almost exactly $NiSO_4 \cdot 6H_2O$.

*Example 3*

The above portion of 1341 parts of reaction mixture was placed in the reactor, which had been flushed out with nitrogen. Acetylene was passed into the reactor and 10 parts by weight of nickel carbonyl added. The rate of flow of acetylene was adjusted to one mole per hour and a solution of 85 parts of nickel carbonyl in 330 parts of methyl ethyl ketone was admitted at the rate of 0.25 mole of nickel carbonyl per hour and maintained at this rate throughout this preparation. Almost at once the stoichiometric reaction began. The rate of flow of acetylene was then gradually increased while carbon monoxide was admitted at a steadily increasing rate until within 55 minutes the rates of flow were 1.50 moles per hour of carbon monoxide and 2.55 moles per hour of acetylene. The rate of addition of water was likewise gradually increased to 3.75 moles per hour. The temperature of the reaction mixture was held at 45°–48° C. The vent gases amounted to 2.9% of the gases admitted. Reaction mixture was taken off by overflow as the reaction proceeded and was stored in a reservoir under a nitrogen atmosphere. The reaction was interrupted only to permit ascertaining the efficiency of the process. At this time there had been admitted in total 1.57 moles of nickel carbonyl, of which 0.01 mole was recovered in the cold trap in the vent gas line, 8.39 moles of carbon monoxide, 15.11 moles of acetylene, 27.84 moles of water, and 1670 parts of solvent. When the supply of carbon monoxide was discontinued, acetylene was run in to consume nickel carbonyl then present, both in the solution in the reactor itself and in the overflow reservoir. The reaction mixture was worked up as above by addition of sulfuric acid and water in amounts nearly proportional to the nickel present. Nickel sulfate hexahydrate was formed. It was removed by filtration. The filtrate was treated with a polymerization inhibitor and distilled under reduced pressure. The main fraction consisted of 96.8% acid, calculated as acrylic acid, 2.0% of acrylic anhydride, and a trace of water. A small amount of a saturated acid was present as the bromine number was about 26 (theory 27.8). The yield of acrylic acid was 75.6%. Residue from distillation accounted for about 5% of the reactants.

*Example 4*

There was placed in the reactor 312 parts by weight of acetone, 5 parts of water, and 107 parts of acrylic acid. The apparatus was flushed with nitrogen. The carbonyl reservoir was initially charged with a mixture of 219 parts of acetone and 105 parts of nickel carbonyl and was recharged as needed with a similar mixture. The water feeder was charged with a mixture of 120 parts of acetone and 50 parts of water and likewise recharged as needed with a mixture of the same proportions. The feed of nickel carbonyl was adjusted to 0.3 mole per hour and acetylene was added at the rate of 1.02 moles per hour. A supply of anhydrous hydrogen chloride was adjusted to 0.5 mole per hour and so maintained. Within three minutes the stoichiometric reaction had started. There was then added a portion of 8 parts of nickel carbonyl. At 15 minutes the temperature of the reaction mixture had risen to 45° C. It was held at this level by a flow of cooling water in the cooling coil. At this time the flow of acetylene was raised to 1.53 moles per hour, water was admitted at 1.65 moles per hour, and carbon monoxide was run in at 0.5 mole per hour. The flow rate of nickel carbonyl in acetone remained constant. At 40 minutes rates were increased to the following values per hour: carbon monoxide, 0.67 mole; acetylene, 1.7 moles; and water, 1.84 moles. Addition of hydrogen chloride and nickel carbonyl remained constant. When it was desired to discontinue the preparation, the supply of nickel carbonyl was shut off, but the gases were allowed to flow for 30 minutes, at which time absorption ceased. The carbon monoxide supply was shut off and acetylene was run for 15 minutes to consume all nickel carbonyl in the reaction mixture. The hydrated nickel chloride which had formed was filtered off and the filtrate was distilled at low pressure. The yield of 98% pure acrylic acid was 65.5%.

It should be commented that when hydrogen chloride is used as the acid throughout the course of the preparation of acrylic acid, nickel chloride is formed continuously. It separates in a finely divided state, but is nevertheless filterable from the reaction medium. A trace of nickel remains in solution, but this does not interfere with the separation and purification of acrylic acid. When hydrogen chloride is thus used, it is noted that utilization of carbon monoxide does not reach the maximum value of 65% possible with use of acrylic acid as the acid to react with nickel carbonyl. Also, at high proportions of carbon monoxide the system is less stable than at reduced ratios of carbon monoxide. If hydrogen chloride is to be used as above, it is best to operate at a ratio of about 40% of carbon monoxide based on the total CO supplied.

Example 5

The reactor system described above was charged with 254 parts of methyl ethyl ketone and 196 parts of acrylic acid containing a trace of $\beta$-naphthol, the apparatus having been swept out with nitrogen. Acetylene was passed through the mixture to sweep out nitrogen and to saturate the liquid. The carbonyl reservoir was charged with a solution made from 195 parts of methyl ethyl ketone and 89 parts of nickel carbonyl and was recharged as needed with more such solution. The flow of acetylene was adjusted to 1.05 moles per hour and the solution of nickel carbonyl was supplied at the rate of 0.25 mole of Ni(CO)$_4$ per hour. Reaction began within three minutes, at which time 4.6 parts of nickel carbonyl were added and the flow of carbon monoxide begun at the rate of 0.67 mole per hour. The flow of acetylene was increased to 1.75 moles per hour. At 20 minutes the rates were increased to 0.82 mole per hour of carbon monoxide and 1.82 moles per hour of acetylene. At 30 minutes rates per hour were adjusted to 2.10 moles of acetylene and one mole of carbon monoxide, a 50% utilization of carbon monoxide for the total CO supplied. At 60 minutes flow of acrylic acid was started at the rate of 195 parts per hour. At 90 minutes the rates per hour were increased to 1.22 moles of carbon monoxide, 2.33 moles of acetylene, and 3 moles of acrylic acid. The reaction mixture appeared as a light green slurry. The temperature was 46° C. At 240 minutes the reactor had become filled and the reaction mixture had begun to overflow into a reservoir provided for receiving it. The vent gas rate was about 3% of the gases being fed. At 370 minutes the carbonyl feeder was shut off. At 395 minutes a rapidly increasing vent rate indicated the end of the catalytic reaction. The supply of carbon monoxide was discontinued and the rate of flow of acetylene was reduced to one mole per hour. After 20 minutes the lack of absorption of acetylene and a decrease in temperature indicated completion of the stoichiometric reaction. The reactor was then drained and the reaction mixture from the overflow reservoir was placed therein and similarly treated with acetylene. The two parts of the reaction mixture were combined and the reactor was flushed with a little methyl ethyl ketone, which was added to the reaction mixture. A total of 3023 parts of reaction mixture was thus obtained. There were found in the cold trap in the vent gas line 10 parts of nickel carbonyl.

The mixture was distilled under reduced pressure with vigorous stirring, leaving behind nickel acrylate as a dry powder. An aliquot portion amounting to 1388 parts of distillate was redistilled. After a forerun of 452 parts there was taken a fraction at 33° C./75 mm. to 37° C./ 2 mm. amounting to 145 parts containing 50% of acrylic acid and 34% of acrylic anhydride. The fraction taken at 38° C./2 mm. to 34° C./ 0.5 mm. amounted to 697 parts. By analysis for total acidity and for anhydride content (by use of sodium methoxide in methanol) this fraction was entirely anhydride. There was a residue of 41 parts. The yield of acrylic anhydride based on the two fractions was 81.8%.

The nickel acrylate was reacted with an equivalent amount of hydrochloric acid to give nickel chloride (hydrated) and acrylic acid. The nickel chloride was filtered off. The filtrate was then treated with a trace of $\beta$-naphthol and distilled under reduced pressure at 51° C./ 20 mm. to give almost pure acrylic acid.

Example 6

The reactor was charged with 387 parts of dioxane, 130 parts of acrylic acid, and 6.8 parts of nickel carbonyl. A solution of nickel carbonyl in dioxane was placed in the carbonyl reservoir. The apparatus was flushed with nitrogen and then with acetylene, as above. Reaction began in about 10 minutes. The flow of nickel carbonyl solution was adjusted to give 0.125 mole per hour of nickel carbonyl. The temperature was held by cooling at 40° to 45° C. There was then supplied carbon monoxide and additional acetylene, the rates of flow being slowly increased until after an hour carbon monoxide was supplied at 0.61 mole per hour and acetylene at 1.13 moles per hour. Acrylic acid was added at the rate of 1.8 moles per hour. After 370 minutes of operation as above, the process was interrupted. The last portions of nickel carbonyl were consumed with acetylene and the reaction mixture was subjected to distillation as above. Part of the distillate was set aside to recharge the reactor. The rest was fractionated at low pressure to give a main fraction of acrylic anhydride. The total yield of this compound was 85% based on the total CO input.

Example 7

The reactor was charged with 400 parts of methyl ethyl ketone and 18 parts of water, the apparatus having been swept out with nitrogen. The carbonyl feeder was charged with a mixture of 171 parts of nickel carbonyl and 370 parts of methyl ethyl ketone. The supply of acetylene was then turned on and adjusted to give 1.05 moles per hour. The nickel carbonyl flow was started at 0.25 mole per hour. Hydrogen chloride was supplied at 0.50 mole per hour. At 3.5 minutes it was observed that the stoichiometric reaction was started. The solution became a deep brown color. At 15 minutes the flow of acetylene was increased to 1.25 moles per hour to offset the reduced pressure in the system resulting from the rapid rate of reaction. Solid nickel chloride appeared at about this time. At 30 minutes the supply of hydrogen chloride was discontinued. At the end of 60 minutes 8 parts of nickel carbonyl were added and carbon monoxide was supplied along with additional acetylene, the rates per hour then being 0.67 mole of carbon monoxide and 1.75 moles of acetylene. Water was supplied at this time at the rate of 1.20 moles per hour. At 90 minutes rates of flow per hour were increased to 1.00 mole of carbon monoxide, 2.10 moles of acetylene, and 1.38 moles of water. The reaction proceeded smoothly. At 180 minutes rates per hour were adjusted to give 1.22 moles of carbon monoxide, 2.33 moles of acetylene, and 1.50 moles of water. This was a 55% utilization of carbon monoxide with reference to the total CO being supplied. These rates were continued until 236 minutes when the rate of addition of water was reduced to 0.67 mole per hour and the nickel carbonyl supply was discontinued. At 273 minutes both water and carbon monoxide were shut off and acetylene supply reduced to 1.05 moles per hour. At 285 minutes the vent gas increased, showing the reaction to be complete. With allowance for nickel carbonyl recovered in the cold trap there were used 7.76 moles of total CO, 9.04 moles of acetylene, 5.78 moles of water, and 0.25 mole of hydrogen chloride.

The reaction mixture was distilled at reduced pressure with vigorous stirring to give a residue consisting of nickel acrylate and nickel chloride. The distillate amounted to 1301 parts. It was fractionally distilled to give 773 parts at 28° C./90 mm. to 35° C./74 mm. (containing 0.89% of acrylic anhydride and 0.35% of acrylic acid), 348 parts at 35° C./74 mm. to 30° C./<1 mm. (containing 10.1% of acrylic anhydride and 26.4% of acrylic acid), and 165 parts at 30°–31° C./<1 mm. containing 98% of acrylic anhydride and 0.3% of acrylic acid. The residue was 15 parts. With allowance for acrylic acid recovered from the nickel acrylate the yields were 52.2% of acrylic anhydride and 21.4% of acrylic acid.

We claim:

1. A process for preparing acrylic anhydride which comprises reacting together acetylene, nickel carbonyl, and acrylic acid at a temperature between 35° and 55° C. in the presence of an inert organic solvent which is at least partially miscible with water and while these substances are reacting together, introducing into the reacting mixture and therein reacting between 35° and 55° C. carbon monoxide and acetylene, the carbon monoxide supplying 20 to 60 mole per cent of the total carbonyl groups of both carbon monoxide and nickel carbonyl, the total acetylene being about equivalent to the total carbonyl groups, and the acrylic acid being used in a proportion about equivalent to the total carbonyl groups and to the nickel.

2. A process for preparing acrylic acid which comprises bringing together in an inert atmosphere acetylene, water, and nickel carbonyl and reacting these together at a temperature between 25° and 75° C. with an acid from the class consisting of acrylic acid, acetic acid, and hydrochloric acid in the presence of an inert organic solvent which is at least partially miscible with water, and while these materials are reacting, introducing into this reacting mixture and reacting therein between 25° and 75° C. carbon monoxide, acetylene, and water, the carbon monoxide supplying 50 to 60 mole per cent of total carbonyl groups from both carbon monoxide and nickel carbonyl, the total acetylene being 102 to 105 mole per cent of the total carbonyl groups, and the water being 100 to 150 mole per cent of the total carbonyl groups.

3. A process for preparing acrylic acid and its anhydride which comprises first reacting by bringing together in a reaction vessel acetylene, water, and nickel carbonyl in the presence of acrylic acid and, while these are reacting, introducing into said reaction vessel and reacting together between 25° and 75° C. acetylene, carbon monoxide, and water, the carbon monoxide supplying not over 65 equivalents of CO per 100 equivalents of total carbonyl groups from both carbon monoxide and nickel carbonyl, and the total acetylene being about equivalent to the total CO.

4. A process for preparing acrylic acid and its anhydride which comprises bringing together and reacting between 25° and 75° C. in the presence of an inert organic solvent which is at least partially miscible with water acetylene, water, nickel carbonyl, and acrylic acid and, while reacting these substances together in said solvent, introducing thereinto and there reacting together, between 25° and 75° C. carbon monoxide, acetylene, and water, the carbon monoxide supplying not over 60 mole per cent of the total carbonyl groups from both carbon monoxide and nickel carbonyl, the total moles of acetylene being in a proportion from 1.02 to 1.05 per mole of total carbonyl groups, and the water being at least half equivalent to the total carbonyl groups.

5. A process for preparing acrylic acid and its anhydride which comprises mixing together and reacting at a temperature between 25° and 75° C. acetylene, water, nickel carbonyl, and an acid from the class consisting of acrylic acid, hydrochloric acid, and acetic acid in the presence of a solvent which is at least partially miscible with water and, while the said substances are reacting together in a reaction mixture, adding to said reaction mixture together with a said solvent acetylene, carbon monoxide, nickel carbonyl, and water, and reacting these together at a temperature between 25° and 75° C., the carbon monoxide supplying between 20% and 65% of the total carbonyl groups from both said monoxide and nickel carbonyl, the acetylene being used in a proportion from 0.9 to 1.1 moles per equivalent of the total carbonyl, and the water being used in a proportion between 0.5 and 1.5 moles per equivalent of total carbonyl groups.

6. A process for preparing acrylic acid which comprises mixing together and reacting at a temperature between 35° and 55° C. acetylene, water, nickel carbonyl, and acrylic acid in the presence of a solvent which is at least partially miscible with water and, while the said substances are reacting together in the reaction mixture, adding thereto said solvent and acetylene, carbon monoxide, nickel carbonyl, and water, reacting these together at a temperature between 25° and 75° C., the carbon monoxide supplying between 20% and 65% of the total carbonyl groups of both said monoxide and nickel carbonyl, the acetylene being used in a proportion between 1.02 and 1.05 moles per carbonyl group from both carbon monoxide and nickel carbonyl, and the water being added in a proportion between 1.05 and 1.5 moles per carbonyl group from both carbon monoxide and nickel carbonyl, treating the reaction mixture with acetylene whereby any nickel carbonyl therein is reacted with acetylene, water, and acid present in said mixture, adding sulfuric acid in an amount equivalent to the nickel content of the reaction mixture whereby nickel sulfate is formed, and separating acrylic acid.

7. A process for preparing acrylic acid which comprises mixing water and acrylic acid in methyl ethyl ketone as a solvent, adding thereto nickel carbonyl and acetylene, reacting at a temperature between 35° and 55° C. in the presence of said solvent water, said acid, nickel carbonyl, and acetylene, whereby acrylic acid is formed, and while these substances are reacting together, adding to the resulting reaction mixture said solvent and the reaction components acetylene, carbon monoxide, water, and nickel carbonyl, and reacting at a temperature between 35° and 55° C. said components and acrylic acid from the reacting mixture, whereby additional acrylic acid is formed, carbon monoxide being added in a proportion supplying 50% to 60% of the total carbonyl from both said monoxide and nickel carbonyl, added acetylene being about equivalent to the total carbonyl, and water being added in proportion between 1.05 and 1.5 moles per mole of total carbonyl.

8. A process for preparing acrylic acid and its anhydride which comprises mixing together and reacting between 25° and 75° C. acetylene, water, nickel carbonyl, and an acid which reacts with and releases carbonyl groups from the nickel carbonyl in the above reaction mixture, said reaction being performed in the presence of an inert organic solvent which is at least partially miscible with water and in which water as soluble to an extent of at least 3%, and while the said substances are reacting together in a reaction mixture, adding thereto acetylene, carbon monoxide, and water, and reacting these together at a temperature between 25° and 75° C., the carbon monoxide being added in a proportion supplying between 20% and 65% of the total carbonyl groups from both said monoxide and nickel carbonyl, the acetylene being used in a proportion from 0.9 to 1.1 moles per unit of total carbonyl, and the water being used in a proportion from 0.5 to 10 moles per unit of total carbonyl.

9. A process for preparing acrylic acid and its anhydride which comprises mixing and reacting together between 25° and 75° C. acetylene, water, and nickel carbonyl together with acrylic acid in the presence of an inert organic solvent which is at least partially miscible with water and in which water is soluble to an extent of at least 3%, and while the said substances are reacting together in the reaction mixture, adding thereto and reacting together at a temperature between 25° and 75° C. acetylene, carbon monoxide, and water, the carbon monoxide being added in a proportion supplying between 20% and 65% of the total carbonyl groups from both said monoxide and nickel carbonyl, the acetylene being used in a proportion from 0.9 to 1.1 moles per unit of total carbonyl, and the water being used in a proportion from 0.5 to 10 moles per unit of total carbonyl.

10. A process for preparing acrylic acid which comprises first mixing in the presence of methyl ethyl ketone as solvent and reacting together between 35° and 55° C. acetylene, water, nickel carbonyl, and hydrogen chloride, whereby acrylic acid is formed in the reacting mixture, and while the said substances are reacting together, adding thereto the components acetylene, carbon monoxide, water, and nickel carbonyl along with methyl ethyl ketone as solvent, and reacting at a temperature between 35° and 55° C. said components and said first-formed acrylic acid, whereby additional acrylic acid is formed, carbon monoxide being added in a proportion supplying 50% to 60% of the total carbonyl from both said monoxide and nickel carbonyl, added acetylene being about equivalent to the total carbonyl, and water being added in a proportion between 1.05 and 1.5 moles per mole of total carbonyl.

11. A process for preparing acrylic acid which comprises first mixing in the presence of an inert organic solvent which is at least partially miscible with water and in which water is soluble to an extent of at least 3% and reacting together between 25° and 75° C. acetylene, water, nickel carbonyl, and hydrogen chloride, and while these said substances are reacting together, adding to the reacting mixture and therein reacting between 25° and 75° C. acetylene, carbon monoxide, water, nickel carbonyl, and hydrogen chloride, also adding solvent to the reacting mixture, carbon monoxide being added in a proportion supplying between 20% and 60% of the total carbonyl from both carbon monoxide and nickel carbonyl, the acetylene being about equivalent to the total carbonyl, and water being added in a proportion between 1.05 and 1.5 moles per mole of total carbonyl.

EDWARD H. SPECHT.
ANDREW NEUMAN.
HARRY T. NEHER.

REFERENCES CITED

The following references are of record in the file of this patent:

UNITED STATES PATENTS

| Number | Name | Date |
|---|---|---|
| 1,973,662 | Sehalch | Sept. 11, 1934 |
| 2,448,368 | Gresham et al. | Aug. 31, 1948 |
| 2,510,105 | Hedberg | June 6, 1950 |

OTHER REFERENCES

Reppe: "Acetylene Chemistry," P. G. Report 18852 S (Chas A. Meyer and Co., Inc.), pp. 155–162 (1949).